US012780300B2

(12) United States Patent
Nahidi et al.

(10) Patent No.: US 12,780,300 B2
(45) Date of Patent: Nov. 3, 2026

(54) VEHICLE STEERING SYSTEM WITH TORQUE STEER MITIGATION AND ROAD ANGLE DETECTION

(71) Applicant: GM GLOBAL TECHNOLOGY OPERATIONS LLC, Detroit, MI (US)

(72) Inventors: Seyedeh Asal Nahidi, North York (CA); Amin Habibnejad Korayem, Markham (CA); Jason W. Gaydos, Waterford, MI (US); Raed Nasim Abuaita, Fenton, MI (US); Ibrahim A. Badiru, Novi, MI (US); SeyedAlireza Kasaiezadeh Mahabadi, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 55 days.

(21) Appl. No.: 18/949,210

(22) Filed: Nov. 15, 2024

(65) Prior Publication Data

US 2026/0138667 A1 May 21, 2026

(51) Int. Cl.
*B62D 6/00* (2006.01)

(52) U.S. Cl.
CPC .................................... *B62D 6/00* (2013.01)

(58) Field of Classification Search
CPC .......... B62D 6/00; B62D 6/002; B62D 6/003; B62D 6/005; B62D 6/008
See application file for complete search history.

(56) References Cited

U.S. PATENT DOCUMENTS

| | | | | |
|---|---|---|---|---|
| 4,871,040 A | | 10/1989 | Zuraski et al. | |
| 5,749,431 A | * | 5/1998 | Peterson | B62D 6/00 180/422 |
| 8,437,913 B2 | * | 5/2013 | Wang | B62D 6/007 701/41 |
| 9,102,333 B2 | * | 8/2015 | Yang | B60W 50/14 |
| 11,479,308 B2 | * | 10/2022 | Gandhi | B62D 37/02 |
| 2014/0324294 A1 | * | 10/2014 | Champagne | B62D 6/001 701/41 |

(Continued)

FOREIGN PATENT DOCUMENTS

| | | |
|---|---|---|
| DE | 102023129284 A1 | 12/2024 |
| DE | 102023133119 A1 | 2/2025 |

OTHER PUBLICATIONS

German Office Action from counterpart DE1020251008647, dated Aug. 5, 2025.

(Continued)

*Primary Examiner* — Carl C Staubach

(57) ABSTRACT

A steering system for a vehicle includes an inertial measurement unit (IMU) configured to measure a first lateral acceleration of the vehicle. A torque sensor is configured to measure a steering wheel torque. A steering control module is configured to receive the steering wheel torque and to generate a steering wheel torque feedback. A torque steer mitigation module is configured to determine a torque steer component of the steering wheel torque feedback. A road angle detection module is configured to estimate a second lateral acceleration of the vehicle independently of a road angle on a road travelled by the vehicle and to selectively detect the road angle based on the first measured lateral acceleration from the IMU and the second lateral acceleration.

20 Claims, 6 Drawing Sheets

(56) References Cited

U.S. PATENT DOCUMENTS

| | | | | |
|---|---|---|---|---|
| 2019/0164363 | A1* | 5/2019 | Javid | B62D 15/021 |
| 2021/0380163 | A1* | 12/2021 | Leydier | B62D 5/0421 |
| 2022/0266901 | A1* | 8/2022 | Kim | B62D 6/008 |
| 2024/0399811 | A1* | 12/2024 | Saylor | B60G 17/06 |
| 2025/0065828 | A1* | 2/2025 | Armiyoon | B60R 16/0231 |
| 2025/0091593 | A1* | 3/2025 | Kasaiezadeh Mahabadi | B60W 50/029 |
| 2025/0136174 | A1* | 5/2025 | Rengarajan | B62D 5/0472 |

OTHER PUBLICATIONS

H. Eric Tseng, Li Xu & Davor Hrovat, "Estimation of land vehicle roll and pitch angles," (2007), Vehicle System Dynamics, 45(5), pp. 433-443.

* cited by examiner

VEHICLE STEERING SYSTEM WITH TORQUE STEER MITIGATION AND ROAD ANGLE DETECTION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to steering systems for vehicles, and more particularly to a steering system supporting torque steer mitigation and road angle detection.

Torque steer may occur during acceleration of vehicles with a driven front axle. Torque steer is typically caused by differences in left and right axle torque or tire tractive forces at the driven front axle during acceleration. A power steering system of the vehicle may perform torque steer mitigation (TSM) to reduce undesired torque steer. The TSM system supplies steering wheel torque feedback to counter or compensate for the torque steer.

SUMMARY

A steering system for a vehicle includes an inertial measurement unit (IMU) configured to measure a first lateral acceleration of the vehicle. A torque sensor is configured to measure a steering wheel torque. A steering control module is configured to receive the steering wheel torque and to generate a steering wheel torque feedback. A torque steer mitigation module is configured to determine a torque steer component of the steering wheel torque feedback. A road angle detection module is configured to estimate a second lateral acceleration of the vehicle independently of a road angle on a road travelled by the vehicle and to selectively detect the road angle based on the first measured lateral acceleration from the IMU and the second lateral acceleration.

In other features, the torque steer mitigation module determines the torque steer component in response to torque steer learning. The torque steer learning utilizes a lookup table that outputs steering wheel torque indexed by front axle torque. The torque steer mitigation module is configured to selectively pause the torque steer learning in response to the road angle detection module detecting the road angle.

In other features, the road angle detection module is configured to estimate the second lateral acceleration further based on a first lateral force on a front axle of the vehicle. The road angle detection module is further configured to estimate the second lateral acceleration based on a second lateral force on a rear axle of the vehicle.

In other features, the road angle detection module estimates the second lateral force on the rear axle of the vehicle based on yaw motion calculated in response to the IMU. The road angle detection module is configured to estimate the second lateral acceleration in response to a first lateral force on a front axle of the vehicle, a second lateral force on a rear axle of the vehicle, and a mass of the vehicle. The road angle detection module is further configured to detect when the vehicle is travelling at the road angle when a difference between the first measured lateral acceleration from the IMU and the second lateral acceleration is greater than a predetermined threshold. The road angle detection module is further configured to calculate a lateral force corresponding to the road angle.

In other features, the road angle detection module is configured to estimate a road angle torque component of the steering wheel torque. The road angle detection module estimates the road angle torque component of the steering wheel torque using the road angle and one of a lookup table and a function. The steering control module adjusts the steering wheel torque feedback further in response to the road angle torque component.

A steering system for a vehicle includes an inertial measurement unit (IMU) configured to measure a first lateral acceleration of the vehicle. A torque sensor is configured to measure a steering wheel torque. A steering control module is configured to receive the steering wheel torque and to generate a steering wheel torque feedback. A torque steer mitigation module is configured to determine a torque steer component of the steering wheel torque feedback in response to torque steer learning. A road angle detection module is configured to estimate a second lateral acceleration of the vehicle independently of a road angle of a road travelled by the vehicle and to selectively detect the road angle in response to a difference between the first measured lateral acceleration from the IMU and the second lateral acceleration is greater than a predetermined threshold. The torque steer mitigation module is further configured to at least one of pause the torque steer learning in response to the road angle detection module detecting the road angle and estimate the second lateral acceleration further based on a first lateral force on a front axle of the vehicle, a second lateral force on a rear axle of the vehicle, and a mass of the vehicle.

In other features, the torque steer learning utilizes a lookup table that outputs steering wheel torque indexed by front axle torque. The road angle detection module estimates the second lateral force on the rear axle of the vehicle based on yaw motion calculated in response to the IMU. The road angle detection module is further configured to calculate a lateral force corresponding to the road angle. The road angle detection module is configured to estimate a road angle torque component of the steering wheel torque.

In other features, the road angle detection module estimates the road angle torque component of the steering wheel torque using the road angle and one of a lookup table and a function. The steering control module adjusts the steering wheel torque feedback further in response to the road angle torque component.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1A:
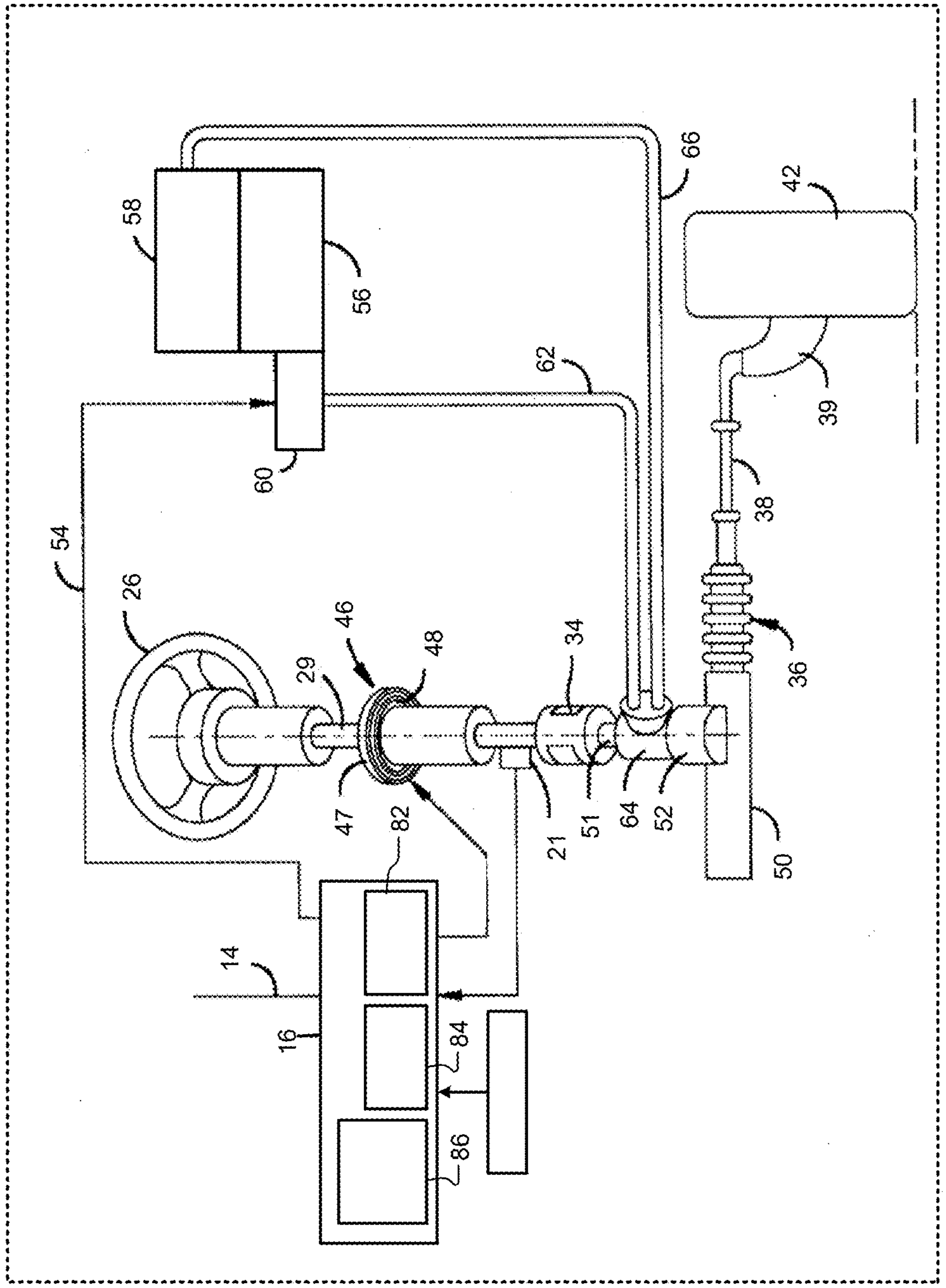
FIG. 1A is a functional block diagram of an example of a hydraulic power steering (HPS) system including a controller with a torque steer mitigation module and a road angle detection module according to the present disclosure.

During acceleration of vehicles with a driven front axle, differences in left and right axle torque or tire tractive forces at the driven front axle may cause torque steer to occur during acceleration. The torque steer pulls the steering wheel in one direction or another, which may cause driver dissatisfaction. The vehicle may include a torque steer mitigation (TSM) module configured to reduce undesired steering wheel torque by causing torque feedback to be supplied to the steering wheel to counter the torque steer.

The vehicle may be operated on roads with a road angle (a convex, angled, banked, or crown surface) to improve water drainage and prevent the accumulation of water on the road surface. When roads are flat or concave, water accumulates on the road surface and may cause the vehicle to hydroplane and/or road damage to occur. While angled roads reduce problems associated with water drainage, they introduce additional lateral forces on the vehicle due to a tilted mass of the vehicle.

The torque steer mitigation (TSM) module may rely on a learning process that adjusts calibration coefficients or other parameters for a given vehicle during high front axle torque events. The TSM system may be adversely impacted when the learning process occurs while the vehicle accelerates or decelerates on an angled road such as a crown road. The road angle produces a steering wheel torque component that can be incorrectly attributed to torque steer. Because crown road can have a contribution to vehicle pull due to lateral forces in addition to torque steer due to unbalanced longitudinal forces, TSM learning function cannot operate well without distinguishing the crown road and non-crown road contributions. Therefore, one solution can be pausing the learning once crown road is detected and another solution can be in a more holistic manner, distinguishing and subtracting the crown road contribution to lateral/yaw deviation.

The vehicle includes a road angle detection module that utilizes one or more sensors (e.g., position and torque sensors) and rack force estimation to assess lateral road forces arising from varying road angles. In some examples, the road angle detection module causes the torque steer mitigation (TSM) module to temporarily pause the learning process when travelling on crown roads. In other examples, the torque steer mitigation (TSM) module estimates lateral forces at the front and rear axles based on rack force measurements and then calculates lateral acceleration on the vehicle and excludes the torque effects caused by the road angle. In other examples, the torque steer mitigation (TSM) module estimates lateral forces at the front axle based on front rack force measurements and at the rear axle based on yaw motion calculated from IMU and external yaw moment due to torque vectoring, and then calculates lateral acceleration on the vehicle and excludes the torque effects caused by the road angle.

By comparing the estimated lateral acceleration with the measured lateral acceleration from a sensor (e.g., an Inertial Measurement Unit (IMU)), an estimated crown road angle can be detected and corresponding steering rack force feedback can be estimated. The torque steer mitigation (TSM) system adjusts the steering wheel torque feedback compensation based on the estimated road angle and the corresponding steering rack force.

For features such as torque steer mitigation, a calibration table or model uses the estimated equivalent road angle to generate steering wheel torque feedback compensation. The steering wheel torque feedback compensation, representing the road resultant steering wheel feedback torque, can then be subtracted from the measured total torque, to yield a refined estimate of steering wheel torque feedback due to driver requested axle torque.

Figure 1B:
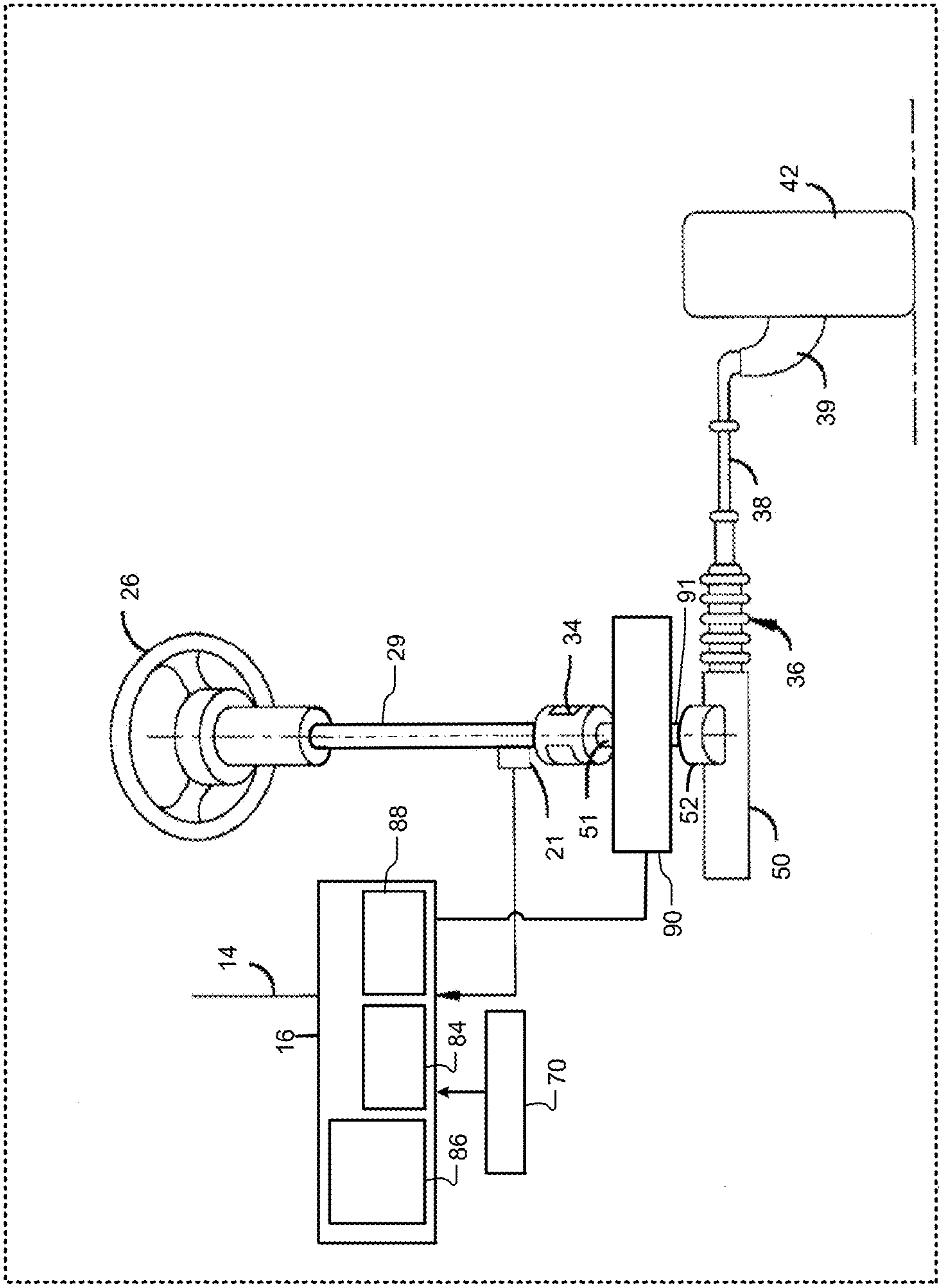
FIG. 1B is a functional block diagram of an example of an electronic power steering (EPS) system including a controller with a torque steer mitigation module and a road angle detection module according to the present disclosure.
Figure 1C:
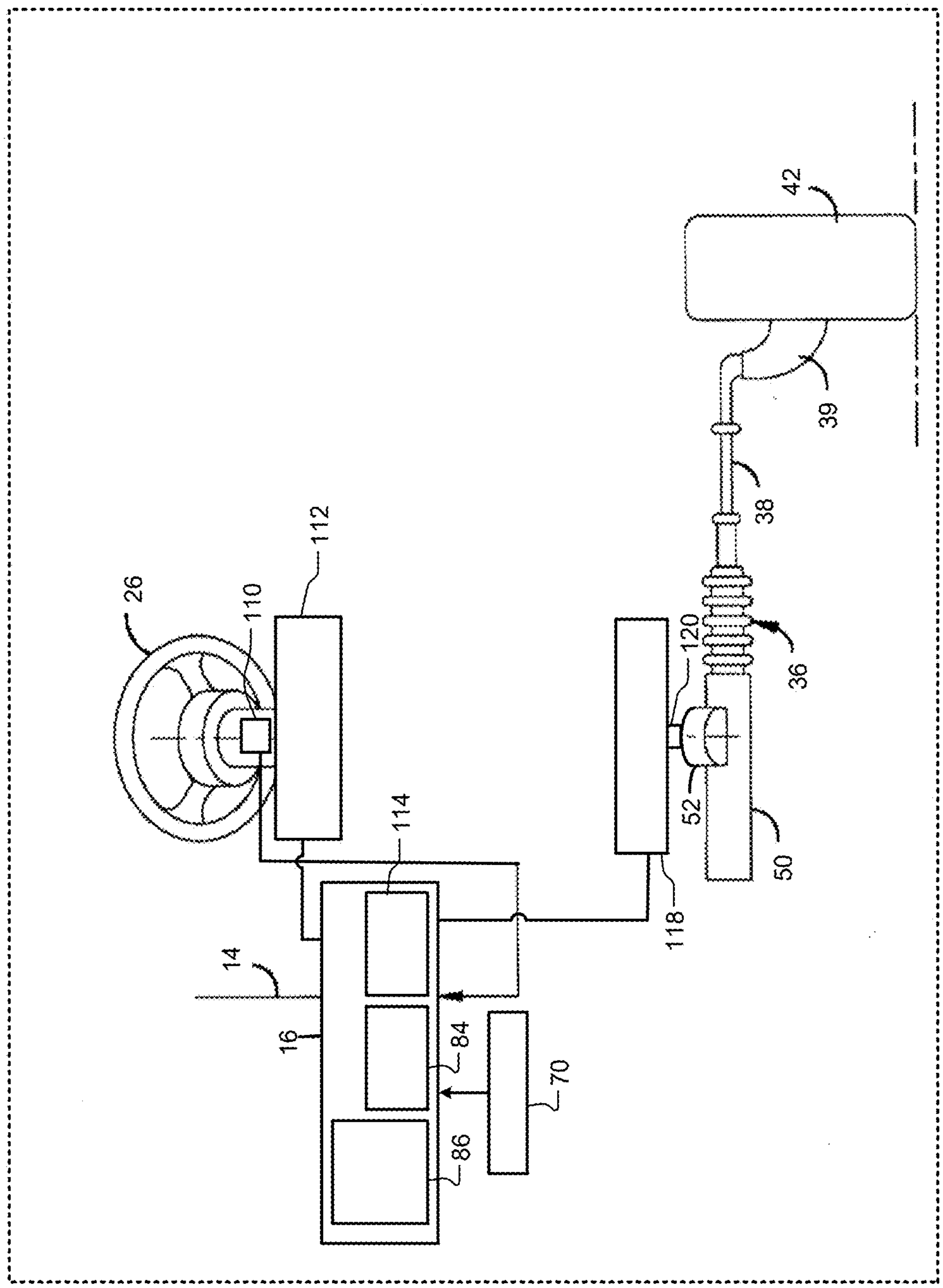
FIG. 1C is a functional block diagram of an example of a steer-by-wire (SBW) system including a controller with a torque steer mitigation module and a road angle detection module according to the present disclosure.
Figure 2:
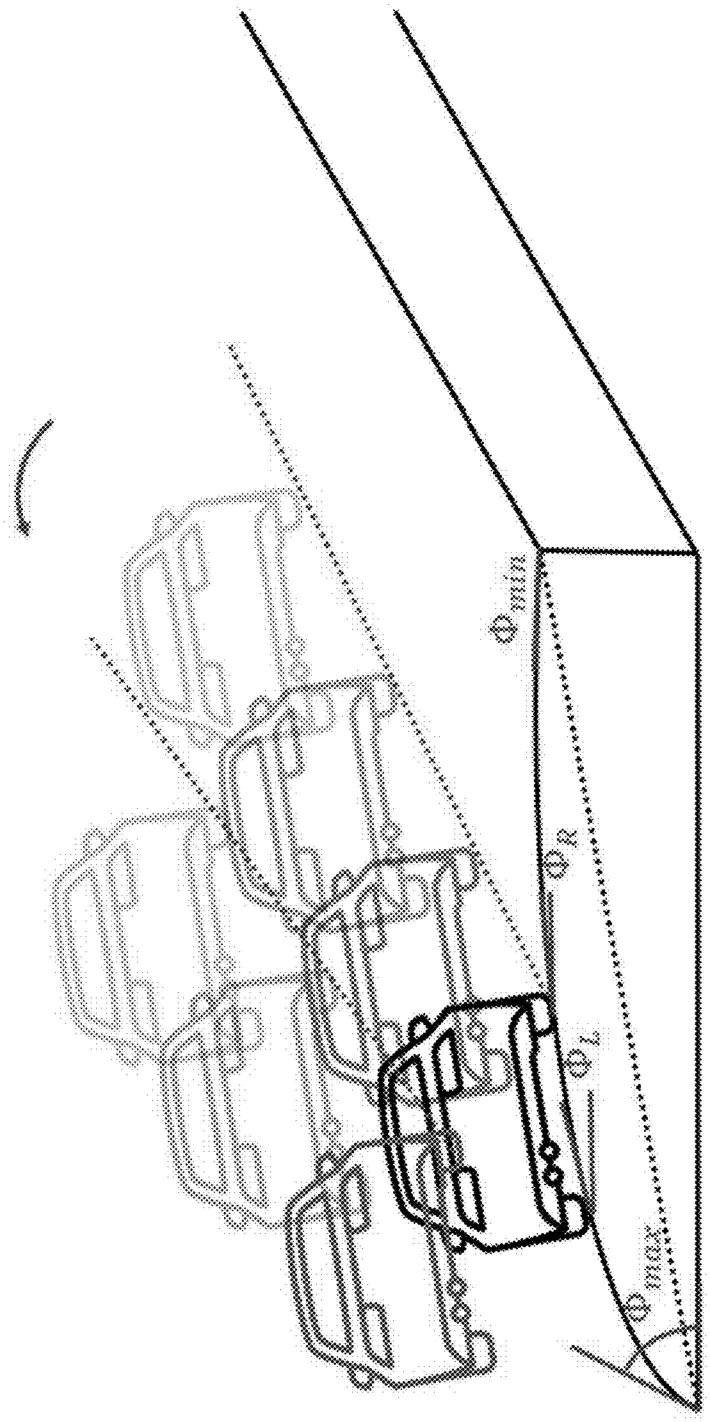
FIG. 2 illustrates an example of a vehicle travelling on flat or angled roads having a non-zero road angle.

Referring now to FIGS. 1A to 1C, examples of hydraulic, electronic, and steer-by-wire power steering systems are shown, respectively. While examples of these power steering systems are shown, other power steering system designs can be used. In FIG. 1A, a steering mechanism 36 is a rack-and-pinion type system that includes a toothed rack (not shown) and a pinion gear (also not shown) located inside rack and gear housings 50 and 52. As a driver turns a steering wheel 26, the steering shaft 29 rotates a lower steering shaft 51, which is connected to the steering shaft 29 through a universal joint 34. The lower steering shaft 51 turns the pinion gear. Rotation of the pinion gear moves the rack which moves tie rods 38 connected to steering knuckles 39 and wheels (one side shown).

The hydraulic power steering system includes an actuator 60 that controls a pump 56 that pumps hydraulic fluid from a reservoir 58. The actuator 60 is connected by a hydraulic line 62 to a variable assist actuator 64. A hydraulic line 66 connects the variable assist actuator 64 back to a reservoir 58. The variable assist actuator 64 provides variable hydraulic assist torque. In general, the vehicle engine (not shown) rotates the pump 56. In response to control signals on line 54, actuator 60 selectively valves the pressurized fluid from the pump 56 to hydraulic line 62, selectively controlling the hydraulic assist torque provided by the system. Hydraulic line 62 is input to the hydraulic assist actuator 64, which provides hydraulic power assist to the steering system through the lower steering shaft 51. Hydraulic fluid output from the hydraulic assist actuator 64 returns to the reservoir 58 through hydraulic line 66.

A torque adjuster 46 variably increases or decreases steering system torque experienced by the driver based on sensed torque steer. In some examples, the torque adjuster 46 includes electromagnetic devices that generate assisting or opposing rotational forces. The controller 16 controls the torque adjuster 46 to either add assist torque or add torque load to the steering system. An example of the torque adjuster 46 is shown and described in commonly-assigned U.S. Pat. No. 4,871,040, which is incorporated herein by reference.

In some examples, a vehicle speed signal 14 is input to the controller 16 and sensors 21 provide a steering wheel position signal and/or a steering wheel torque signal to controller 16. The controller 16 also uses steering wheel speed information, which the controller 16 may determine by integrating the steering wheel position signal. In some examples, the sensor 21 may include an optical encoding type sensor, variable resistance type sensor or any other suitable type of position sensor in addition to the torque sensor.

In operation, as the driver drives the vehicle and turns the steering wheel, the controller 16 senses the vehicle speed, steering wheel position, steering wheel torque, and/or steering wheel velocity. The controller 16 generates commands for both the torque adjuster 46 and the actuator 60. By controlling the flow of hydraulic fluid through actuator 60 to hydraulic line 62, the controller 16 indirectly controls the pump 56, which automatically turns on and off in response to fluid pressure in the reservoir 58. Controller 16 controls the actuator 60 so that, during normal driving conditions, a relatively constant low flow of hydraulic fluid is provided to the hydraulic assist actuator 64 through hydraulic line 62. The flow of hydraulic fluid to the actuator 64 is increased in response to high steering wheel velocity or lateral acceleration maneuvers. Torque adjuster 46 provides the difference in torque assist between that provided by the constant flow rate to the actuator and that required by the vehicle driver, either countering the torque provided by variable assist actuator 64 or adding thereto.

The controller 16 includes a torque steer mitigation module 84 that estimates the torque steer feedback. In some examples, the torque steer mitigation module 84 adjusts operation of the torque steer mitigation module 84 using a learning process. The torque steer feedback is output to a hydraulic power steering module 82 that adjusts operation of the torque adjuster 46.

A road angle detection module 86 described further below detects when the vehicle is driving at a road angle and selectively disables learning by the torque steer module and/or provides a road angle torque feedback to the hydraulic power steering module 82.

In FIG. 1B, an input of an electronic power steering (EPS) motor 90 is connected to the steering shaft 29. An output of the EPS motor 90 is connected to a steering shaft 91 driving the pinion. The EPS motor 90 varies torque assist in response to an EPS module 88, the torque steer mitigation module 84, and the road angle detection module 86 as will be described further below.

In FIG. 1C, an angular position and torque of the steering wheel 26 are sensed by sensors 110. A steering wheel motor 112 is configured to provide steering wheel feedback to the steering wheel 26 to provide road feel. The controller 16 is configured to control a road wheel angle (RWA) motor 118 configured to adjust an angle of the wheels. The steering wheel motor 112 varies torque assist in response to a steer-by-wire (SBW) module 114, the torque steer mitigation module 84, and the road angle detection module 86 as will be described further below. An output of the RWA motor 118 is connected by a steering shaft 120 driving the pinion.

In a first step, the road angle detection module 86 detects a road angle. In some examples, to eliminate or reduce the effect of the road angle on the lateral force estimation, the estimation of lateral force is based on rack force in the front axle $F_{y_f}$:

$$F_{y_f} = \left( \frac{LF_r - F_{xtotal}\cos(\tau)[r_{kp}\cos(\gamma) + R_{nom}\sin(\gamma)] - T_{z_{total}}}{\cos(\gamma)[t\cos(\tau) + R_{nom}\sin(\tau)]} \right)$$

where, $T_{z_{total}}$, $F_{z_{total}}$, and $N_{fx}$ can be calculated as follows:

$$T_{z_{total}} = F_{z_{total}}\sin(\gamma)\cos(\tau)\sin(\delta_f)[\cos(\tau)(r_{kp} + R_{nom}\sin(\tau))];$$

-continued $$F_{z_{total}} = \frac{N_{fx}}{2} + \frac{Z_g N_{fx} a_y}{L_f g}; \text{ and}$$

$$N_{fx} = \frac{mgX_r}{X_r + X_f} - \frac{ma_x Z_g}{X_r + X_f}$$

where L is the steering arm lever, $F_r$ is the rack force, $r_{kp}$ is the steering axis offset from the tire in lateral direction, $R_{nom}$ is the nominal tire radius, γ is the kingpin angle, and τ is the camber angle. $X_f$ and $X_r$ are the vehicle wheelbase from the center of gravity (CG) to front and rear axle, respectively. m represents vehicle unsprung mass, and $Z_g$ represents the vehicle center of gravity (CG) height. g represents a gravity coefficient. $a_x$ and $a_y$ are longitudinal and lateral acceleration. $\delta_f$ is the front tires steering angle. $L_f$ is the front axle track width. $T_{z_{total}}$ is the total resistant torque generated around the steering z axis. $F_{z_{total}}$ is the total resistant force generated around the steering z axis. $N_{fx}$ is the nominal tire force.

In some examples, lateral force in a rear axle of the vehicle is estimated based on yaw motion $I_z\dot{r}$ calculated from the IMU 70 and external yaw moment due to torque vectoring devices as:

$$I_z\dot{r} = T_M + L_1 F_{yf}\cos(\delta_f) - L_2 F_{yr}; \text{ and}$$

$$F_{yr} = (T_M + L_1 F_{yf}\cos(\delta_f) - I_z\dot{r})/L_2$$

where $T_M$ is traction force, $L_1$ is front axle length, $F_{yf}$ is front lateral tire force, $L_2$ is rear axle length, $F_{yr}$ is rear lateral tire force, and $I_z\dot{r}$ is yaw motion, Lateral acceleration $\hat{a}_y$ can be estimated utilizing estimation of lateral forces in the front and rear axles as follows:

$$\hat{a}_y = (F_{yf} + F_{yr}\cos(\delta_r))/M$$

The lateral acceleration is compared to the lateral acceleration measured by the IMU 70 as follows: $\hat{a}_y - a_{y_{meas}} = \Delta a_y \geq T$. If the difference between the estimated acceleration $\hat{a}_y$ and measured lateral acceleration $a_{y_{meas}}$ exceeds a predetermined threshold T, then it can be concluded that the vehicle is subjected to road angle. The road angle contribution to lateral forces is computed as:

$$F_{y,road} = \begin{cases} mg(\sin\varphi) & (\varphi = \varphi_L = \varphi_R)\text{: constant angle} \\ mg(\sin\varphi_L - \sin(\varphi_L - \varphi_R) = \sin(\varphi_{eqv})) & (\varphi_L \neq \varphi_R)\text{: variable angle} \end{cases}$$

Therefore, generally $a_{y_{meas}} - \hat{a}_y = mg\sin(\varphi_{eqv})$.

The torque steer strategy is selected. In one approach, TSM learning is paused when the vehicle is subjected to a road angle. In another approach, compensation is calculated for the effect of road angle on lateral motion and steering wheel torque feedback calculations.

A steering wheel torque calculation is performed. A calibration table can be utilized to map the estimated (crown) road angle to steering wheel torque. $T_{steering,road} = f(\phi_{eqv})$. In some examples, the torque feedback changes more gradually at smaller crown road angles and more aggressively at larger crown road angles, or vice versa, depending on how the system is calibrated. Thus, $T_{steering,feedback}=T_{meas}-T_{steering,road}$ or $T_{steering,feedback}=f(\hat{a}_y)$ where, $T_{meas}$ is the measured steering torque and $T_{steering,road}$ is the estimated road resultant steering wheel torque.

Then, torque steer mitigation modification is performed. The calculated steering wheel torque feedback, $T_{steering,feedback}$ is utilized in TSM calculations.

Figure 3:
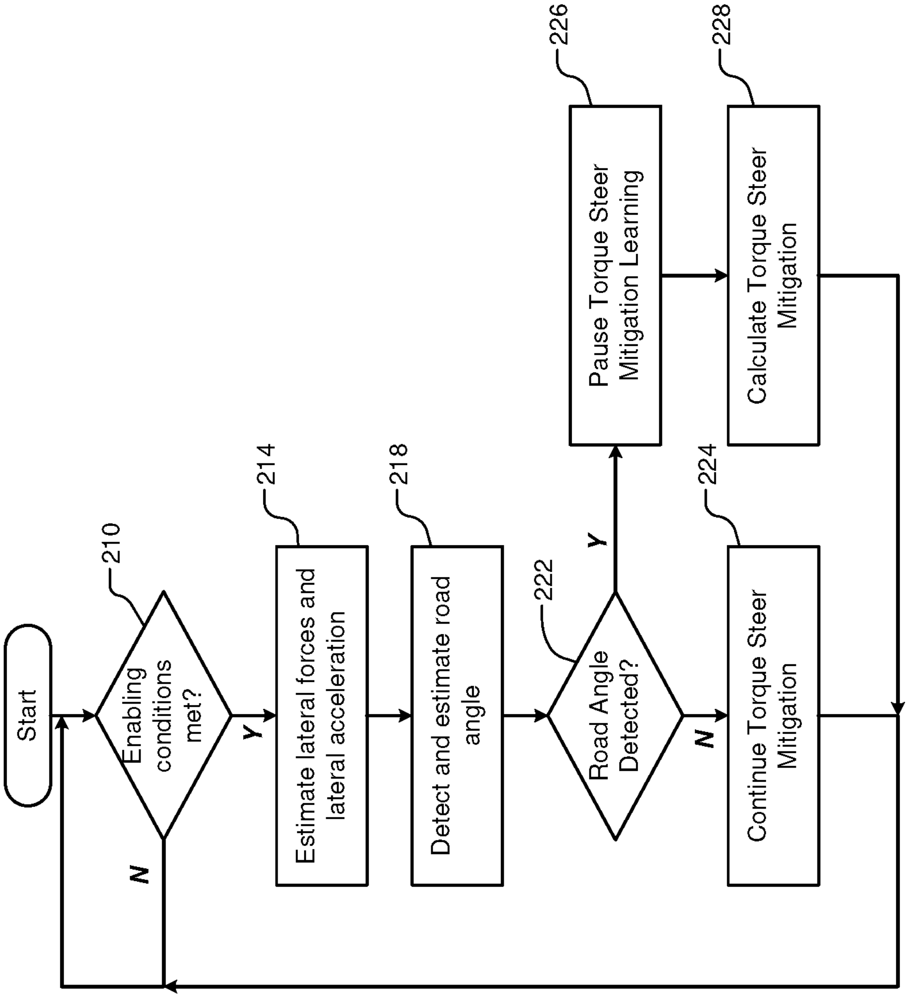
FIG. 3 is a flowchart of an example of a method for adjusting torque steer feedback in response to detection of the road angle according to the present disclosure.

Referring now to FIG. 3, a first method for performing torque steer mitigation according to the present disclosure is shown. At 210, the method determines whether enabling conditions are met. In some examples, the enabling conditions include roll motion being less than a predetermined value and cross wind being less than a predetermined value. An example of roll motion detection can be found in "Estimation of land vehicle roll and pitch angles," Eric Tseng, H., Xu, L., & Hrovat, D. (2007), Vehicle System Dynamics, 45(5), pages 433-443, which is hereby incorporated herein by reference in their entirety. An example of cross wind detection can be found in U.S. Pat. No. 9,102,333, entitled "Enhanced Crosswind Estimation", and issued on Aug. 11, 2015, and U.S. Pat. No. 11,479,308, entitled "Active Vehicle Interface for Crosswind Management", and issued on Oct. 25, 2022, which are hereby incorporated herein by reference in their entirety.

At 214, the method estimates the lateral forces and lateral acceleration. At 218, the method detects and estimates the road angle. At 222, the method determines whether the vehicle is on a road oriented at an angle. If 222 is false, the method continues torque steer mitigation and learning at 224. If 222 is true, the method pauses torque steer mitigation learning at 226. At 228, the method calculates torque steer mitigation without the torque steer mitigation learning while the vehicle is travelling on a road at an angle.

Figure 4:
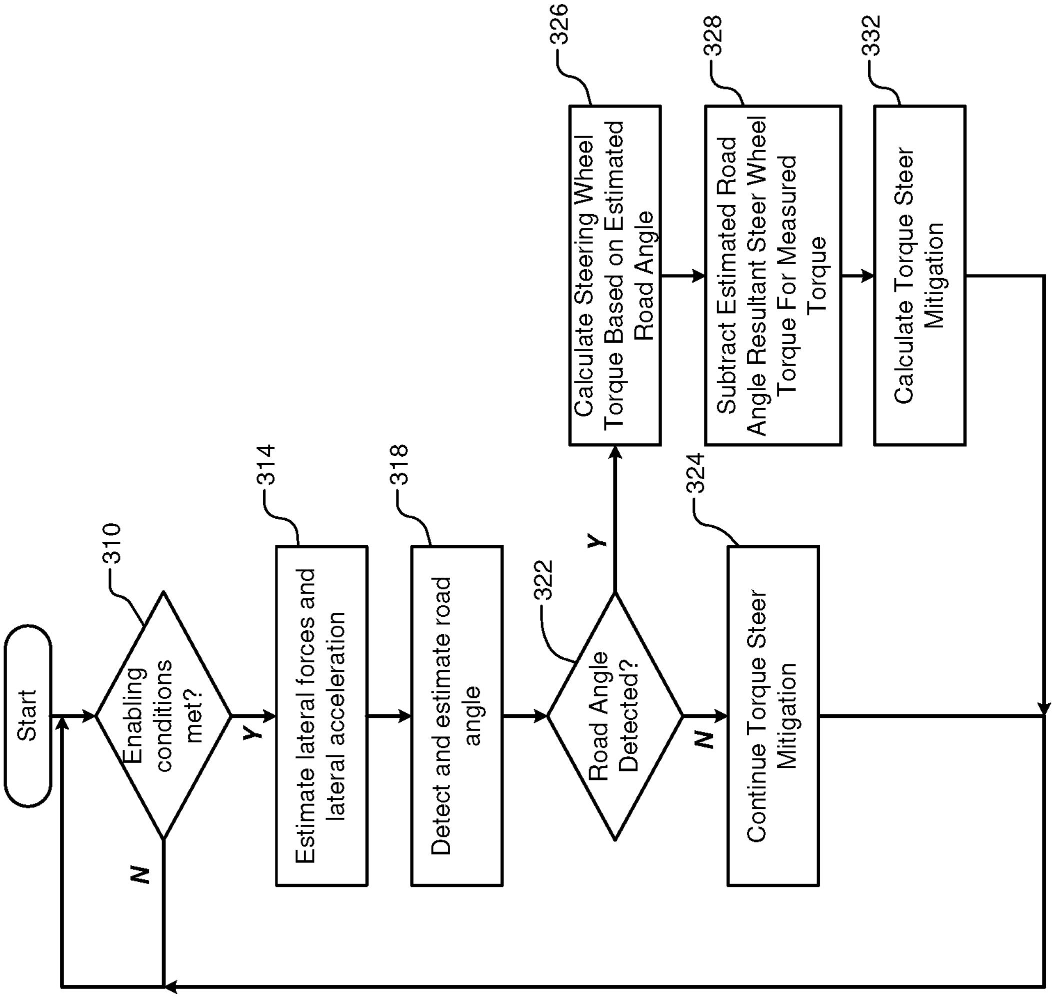
FIG. 4 is a flowchart of an example of a method for adjusting torque steer mitigation in response to detection of a road angle according to the present disclosure.

Referring now to FIG. 4, another method for performing torque steer mitigation according to the present disclosure is shown. At 310, the method determines whether enabling conditions are met. At 314, the method estimates lateral forces and lateral acceleration. At 318, the method detects and estimates the road angle. At 322, the method determines whether a road angle (e.g., corresponding to a crown road causing steering torque) is detected. If 322 is false, the method continues torque steer mitigation at 324. If 322 is true, the method calculates steering wheel torque based on estimated road angle at 326. At 328, the method subtracts estimated road angle resultant steering wheel torque from the measured torque at the steering wheel. At 332, the method calculates the torque steer mitigation.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A steering system for a vehicle, comprising:

an inertial measurement unit (IMU) configured to measure a first lateral acceleration of the vehicle;

a torque sensor configured to measure a steering wheel torque of a steering wheel of the vehicle;

a steering control module configured to receive the steering wheel torque and to generate a steering wheel torque feedback to control a road feel of the steering wheel relative to the steering wheel torque;

a torque steer mitigation module configured to determine a torque steer component of the steering wheel torque feedback; and a road angle detection module configured to estimate a second lateral acceleration of the vehicle independently of a road angle on a road travelled by the vehicle and to detect the road angle based on a comparison of the first measured lateral acceleration from the IMU and the second lateral acceleration, wherein the torque steer mitigation module is configured to process the road angle detected by the road angle detection module, determine torque effects caused by the road angle, and exclude torque effects caused by the road angle from the torque steer component.

2. The steering system of claim 1, wherein the torque steer mitigation module determines the torque steer component in response to torque steer learning.

3. The steering system of claim 2, wherein the torque steer learning utilizes a lookup table that outputs steering wheel torque indexed by front axle torque.

4. The steering system of claim 2, wherein the torque steer mitigation module is configured to selectively pause the torque steer learning in response to the road angle detection module detecting the road angle.

5. The steering system of claim 1, wherein the road angle detection module is configured to estimate the second lateral acceleration further based on a first lateral force on a front axle of the vehicle.

6. The steering system of claim 5, wherein the road angle detection module is further configured to estimate the second lateral acceleration based on a second lateral force on a rear axle of the vehicle.

7. The steering system of claim 6, wherein the road angle detection module estimates the second lateral force on the rear axle of the vehicle based on yaw motion calculated in response to the IMU.

8. The steering system of claim 1, wherein the road angle detection module is configured to estimate the second lateral acceleration in response to a first lateral force on a front axle of the vehicle, a second lateral force on a rear axle of the vehicle, and a mass of the vehicle.

9. A steering system for a vehicle, comprising:

an inertial measurement unit (IMU) configured to measure a first lateral acceleration of the vehicle;

a torque sensor configured to measure a steering wheel torque of a steering wheel of the vehicle;

a steering control module configured to receive the steering wheel torque and to generate a steering wheel torque feedback to control a road feel of the steering wheel relative to the steering wheel torque;

a torque steer mitigation module configured to determine a torque steer component of the steering wheel torque feedback; and a road angle detection module configured to estimate a second lateral acceleration of the vehicle independently of a road angle on a road travelled by the vehicle and to detect the road angle based on the first measured lateral acceleration from the IMU and the second lateral acceleration, wherein the road angle detection module is configured to estimate the second lateral acceleration further based on a first lateral force on a front axle of the vehicle, wherein the road angle detection module is further configured to detect when the vehicle is travelling at the road angle when a difference between the first measured lateral acceleration from the IMU and the second lateral acceleration is greater than a predetermined threshold.

10. The steering system of claim 1, wherein the road angle detection module is further configured to calculate a lateral force corresponding to the road angle.

11. The steering system of claim 1, wherein the road angle detection module is configured to estimate a road angle torque component of the steering wheel torque.

12. The steering system of claim 11, wherein the road angle detection module estimates the road angle torque component of the steering wheel torque using the road angle and one of a lookup table and a function.

13. The steering system of claim 12, wherein the steering control module adjusts the steering wheel torque feedback further in response to the road angle torque component.

14. A steering system for a vehicle, comprising:

an inertial measurement unit (IMU) configured to measure a first lateral acceleration of the vehicle;

a torque sensor configured to measure a steering wheel torque of a steering wheel of the vehicle;

a steering control module configured to receive the steering wheel torque and to generate a steering wheel torque feedback to control a road feel of the steering wheel relative to the steering wheel torque;

a torque steer mitigation module configured to determine a torque steer component of the steering wheel torque feedback in response to torque steer learning; and a road angle detection module configured to estimate a second lateral acceleration of the vehicle independently of a road angle of a road travelled by the vehicle and to detect the road angle in response to a difference between the first measured lateral acceleration from the IMU and the second lateral acceleration is greater than a predetermined threshold, wherein the torque steer mitigation module is further configured to at least one of:

pause the torque steer learning in response to the road angle detection module detecting the road angle; and estimate the second lateral acceleration further based on a first lateral force on a front axle of the vehicle, a second lateral force on a rear axle of the vehicle, and a mass of the vehicle.

15. The steering system of claim 14, wherein the torque steer learning utilizes a lookup table that outputs steering wheel torque indexed by front axle torque.

16. The steering system of claim 15, wherein the road angle detection module estimates the second lateral force on the rear axle of the vehicle based on yaw motion calculated in response to the IMU.

17. The steering system of claim 15, wherein the road angle detection module is further configured to calculate a lateral force corresponding to the road angle.

18. The steering system of claim 15, wherein the road angle detection module is configured to estimate a road angle torque component of the steering wheel torque.

19. The steering system of claim 18, wherein the road angle detection module estimates the road angle torque component of the steering wheel torque using the road angle and one of a lookup table and a function.

20. The steering system of claim 18, wherein the steering control module adjusts the steering wheel torque feedback further in response to the road angle torque component.

* * * * *